(12) United States Patent  
Fujimori et al.

(10) Patent No.: US 6,667,383 B2  
(45) Date of Patent: Dec. 23, 2003

(54) POLYESTER RESIN AND PROCESS FOR ITS PRODUCTION

(75) Inventors: Yoshihiro Fujimori, Mie (JP); Masahiro Nukui, Mie (JP); Yutaka Yatsugi, Mie (JP); Kenichi Matsui, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/263,716

(22) Filed: Oct. 4, 2002

(65) Prior Publication Data

US 2003/0109667 A1 Jun. 12, 2003

Related U.S. Application Data

(63) Continuation of application No. PCT/JP02/00981, filed on Feb. 6, 2002.

(30) Foreign Application Priority Data

Feb. 6, 2001 (JP) .......................................... 2001-29135

(51) Int. Cl.[7] .............................................. C08G 63/78
(52) U.S. Cl. ........................ 528/279; 528/275; 528/277; 528/283; 528/286; 528/300; 528/308; 528/308.6; 528/499; 528/503
(58) Field of Search ................................ 528/275, 277, 528/279, 283, 286, 300, 308, 308.6, 499, 503

(56) References Cited

U.S. PATENT DOCUMENTS

| | | |
|---|---|---|
| 5,453,479 A | 9/1995 | Borman et al. |
| 5,886,133 A | 3/1999 | Hilbert et al. |
| 6,160,085 A | 12/2000 | Fujimori et al. |
| 6,200,659 B1 | 3/2001 | Fujimori et al. |

FOREIGN PATENT DOCUMENTS

| | | |
|---|---|---|
| EP | 0 745 629 | 12/1996 |
| EP | 1 013 692 | 6/2000 |
| EP | 1 065 230 | 1/2001 |
| JP | 53-101093 | 9/1978 |
| JP | 4-270727 | 9/1992 |
| JP | 6-100679 | 4/1994 |
| JP | 6-104718 | 12/1994 |
| JP | 9-87374 | 3/1997 |
| JP | 2000-143789 | 5/2000 |
| JP | 2001-200046 | 7/2001 |
| JP | 2002-179781 | 6/2002 |

*Primary Examiner*—Samuel A. Acquah  
(74) *Attorney, Agent, or Firm*—Oblon, Spivak, McClelland, Maier & Neustadt, P.C.

(57) ABSTRACT

A polyester resin is prepared by polycondensing a dicarboxylic acid component containing terephthalic acid or its ester-forming derivative as the main component, and a diol component containing ethylene glycol as the main component in the presence of (1) a compound of at least one member selected from the group consisting of titanium group elements in Group 4A of the Periodic Table, via an esterification reaction or an ester exchange reaction, wherein the content of copolymerized components other than the terephthalic acid component and the ethylene glycol component, is not more than 4 mole % based on the total dicarboxylic acid component, and in a molded product with a thickness of 3.5 mm injection-molded at 280° C., the difference between the absorbance at a wavelength of 395 nm and the absorbance at a wavelength of 800 nm is at least 0.08, and the difference between the absorbance at a wavelength of 500 nm and the absorbance at a wavelength of 800 nm is at most 0.05.

15 Claims, 1 Drawing Sheet

(a)

(b)

POLYESTER RESIN AND PROCESS FOR ITS PRODUCTION

TECHNICAL FIELD

The present application claims a benefit of Japanese Patent Application No. 2001-29135, and the content of this application will be referred to as a reference in the present specification.

The present invention relates to a polyester resin, whereby a molded product excellent in a gas barrier property and also excellent in an ultraviolet shielding property, a color tone, etc., and which is particularly suitable for molding a bottle for e.g. a beverage required to have an aroma retention property, and further, to a polyester resin, whereby the acetaldehyde content in a molded product is reduced to eliminate an influence over the taste, aroma, etc. of the content, and a process for its production, whereby the polycondensability is improved.

BACKGROUND ART

Heretofore, a polyester resin such as a polyethylene terephthalate resin has been widely used for packaging containers for various beverages, etc., since it is excellent in mechanical strength, chemical stability, gas barrier property, aroma-retention property, hygienics, etc., and is relatively inexpensive and light in weight. Especially, as a container for a beverage which requires heat sterilization filling, for e.g. a fruit juice beverage, a bottle having a high gas barrier property, etc. imparted by an application of stretch heat setting, has shown a rapid expansion. Such a bottle is produced, for example, by injection molding a bottomed tubular preform, reheating the preform to soften it, followed by stretch blow molding. At that time, the blow mold is heated to apply heat setting to the bottle, whereby crystals of molecular chains aligned by stretching are fixed to provide the high gas barrier property, etc.

However, with respect to the polyethylene terephthalate resin to be used in such a field of beverage containers, in the case of a polyethylene terephthalate resin produced by using an antimony compound as a polycondensation catalyst, which is most commonly used for bottles for wide range of purpose, copolymerizable components such as isophthalic acid, diethylene glycol, etc. other than the terephthalic acid component and the ethylene glycol component, are copolymerized in an amount of from about 3 to 10 mol % based on the total dicarboxylic acid component in order to provide transparency, whereby the intended gas barrier property may not be obtained, whereby the aroma-retention property as a bottle tends to decrease, and the aroma of the content is likely to decrease, or the ultraviolet shielding property tends to be poor, whereby the flavor component or the color tone of the content is likely to deteriorate, and further, another problem is also worried such that antimony remaining in the resin will elute from the container at a high temperature and will transfer to the contained beverage although slightly. On the other hand, with a polyethylene terephthalate resin prepared by using a germanium compound as a polycondensation catalyst, which is commonly used for heat resistant bottles, copolymerizable components other than the terephthalic acid component and the ethylene glycol component, may be copolymerized in a relatively small amount at a level of more than 2 to 5 mol % based on the total dicarboxylic acid component, but the above-mentioned problem relating to a decrease of the aroma-retention property cannot still be solved, and the ultraviolet shielding property is also inferior, and further, the germanium compound is expensive, whereby an economical disadvantage cannot be avoided. Accordingly, it is strongly desired to have a substitute polycondensation catalyst developed.

Further, many polyethylene terephthalate resins have been proposed which are prepared by using titanium compounds as polycondensation catalysts, but they have had problems such that they lack in thermal stability, so that the obtainable resins tend to have a yellowish color tone, or the change in the color tone after being heated is substantial, and further have problems such that acetaldehyde, a cyclic trimer, etc. are formed in a large amount as by-products during the polycondensation and the melt molding, and when used as bottles, they tend to deteriorate the tastes, aromas, etc. of the contained beverages. Whereas, e.g. JP-A-8-73581 discloses a process for producing a polyethylene terephthalate resin which is colorless and excellent in transparency, by using a titanium compound, a cobalt compound, and a limited amount of complex-forming agent, such as phosphoric acid, phosphorous acid and/or phosphonic acid or its derivative. However, according to the study conducted by the present inventors, it has been found that the polyethylene terephthalate resin obtainable by this process is not one which is able to solve the above-mentioned problem such as a decrease in the aroma-retention property and the problem such as deterioration of the taste, the aroma, etc. of the content.

Further, EP-A-1013692 discloses that production of acetaldehyde as a by-product during the polycondensation and the melt molding can be suppressed by using titanium and metal compounds, as polycondensation catalysts, so that specific amounts of titanium atoms and metal atoms such as magnesium, would be in a specific ratio. Further, in JP-A-2000-339919 filed by the present applicants, it is disclosed that in the polycondensation in the presence of (1) a titanium compound, (2) a compound of at least one element selected from the group consisting of metal elements of Group 1A of the periodic table, elements of Group 2A of the periodic table and manganese, and (3) a phosphorus compound, the order of addition of the respective compounds (1), (2) and (3) is set to be (3), then (2) and then (1), whereby by-products such as acetaldehyde, a cyclic trimer, etc., can be reduced. However, according to the study by the present inventors, it has been found that these methods are certainly effective to reduce by-products, but with the disclosed methods, there is still a room for improvement with respect to the gas barrier property, the ultraviolet shielding property or the polycondensability.

The present invention has been made in view of the above-described prior art, and it is an object of the present invention to provide a polyester resin, whereby a molded product excellent in the gas barrier property and also excellent in the ultraviolet shielding property, the color tone, etc., and which is particularly suitable for molding a bottle for e.g. a beverage required to have an aroma-retention property, and further, a polyester resin, whereby the acetaldehyde content as a molded product is reduced to eliminate an influence over the taste, the aroma, etc. of the content, and a process for its production, whereby the polycondensability is improved.

DISCLOSURE OF THE INVENTION

As its gist, the present invention provides a polyester resin produced by polycondensing a dicarboxylic acid component containing terephthalic acid or its ester-forming derivative as the main component, and a diol component containing ethylene glycol as the main component in the presence of (1) a compound of at least one member selected from the group consisting of titanium group elements in Group 4A of the periodic table, via an esterification reaction or an ester exchange reaction, characterized in that the content of copolymerized components other than the terephthalic acid component and the ethylene glycol component, is not more than 4 mol % based on the total dicarboxylic acid component, and in a molded product with a thickness of 3.5 mm injection-molded at 280° C., the difference between the absorbance at a wavelength of 395 nm and the absorbance at a wavelength of 800 nm is at least 0.08, and the difference between the absorbance at a wavelength of 500 nm and the absorbance at a wavelength of 800 nm is at most 0.05.

Further, as its gist, the present invention provides a process for producing a polyester resin, which comprises polycondensing a dicarboxylic acid component containing terephthalic acid or its ester-forming derivative as the main component, and a diol component containing ethylene glycol as the main component in the presence of (1) a compound of at least one member selected from the group consisting of titanium group elements in Group 4A of the periodic table, (2) a compound of at least one element selected from the group consisting of metal elements of Group 1A of the periodic table, elements of Group 2A of the periodic table, manganese, iron and cobalt, and (3) a phosphorus compound, via an esterification reaction or an ester exchange reaction, characterized in that the amounts of the respective compounds (1), (2) and (3) are such amounts that their contents will be from 0.02 to 0.2 mol as the total amount (T) of atoms of the compound (1), from 0.04 to 0.6 mol as the total amount (M) of atoms of the compound (2) and from 0.02 to 0.4 mol as the total amount (P) of atoms of the compound (3), per 1 ton of the polyester resin.

BRIEF DESCRIPTION OF THE DRAWINGS

FIG. 1(*b*): a front view of the stepped molded plate for evaluation of the physical properties, molded in Examples.

BEST MODE FOR CARRYING OUT THE INVENTION

Figure 1:
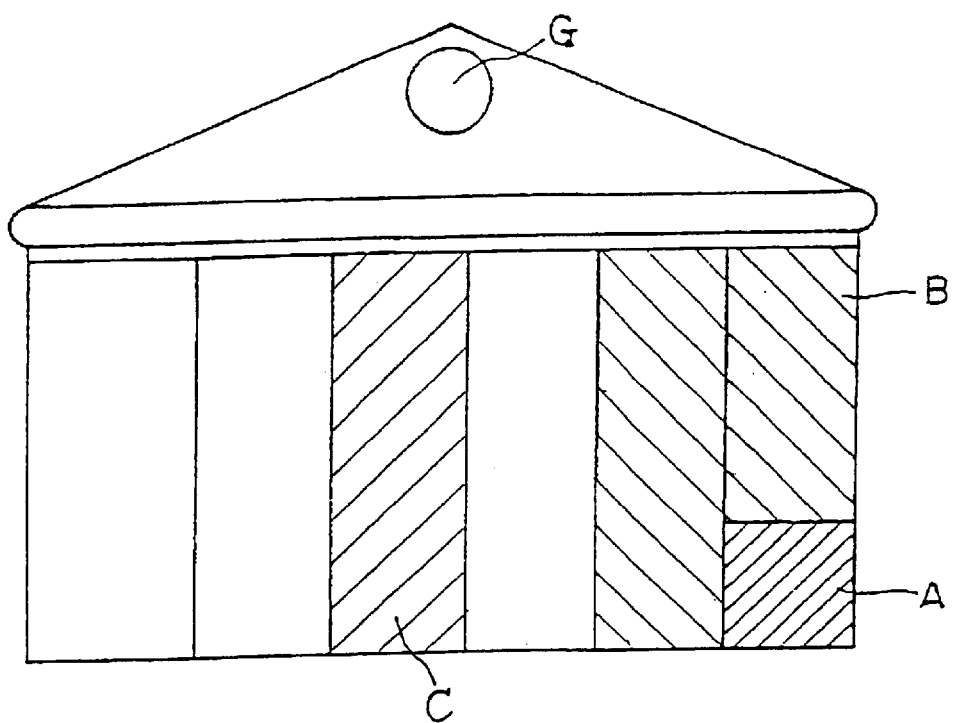
FIG. 1(*a*): a plan view of a stepped molded plate for evaluation of the physical properties, molded in Examples.
Figure 1:
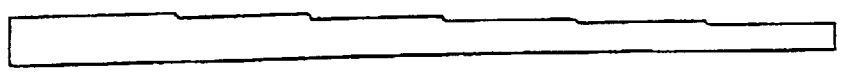

The polyester resin of the present invention is one produced by polycondensing a dicarboxylic acid component containing terephthalic acid or its ester-forming derivative as the main component, and a diol component containing ethylene glycol as the main component, via an esterification reaction or an ester exchange reaction, and is preferably a polycondensate of a dicarboxylic acid component in which the terephthalic acid component constitutes at least 96 mol %, more preferably at least 99 mol %, of the total dicarboxylic acid component, with a diol component in which the ethylene glycol component constitutes at least 96 mol %, more preferably at least 97 mol %, of the total diol component. If the proportion of the terephthalic acid component in the total dicarboxylic acid component, and the proportion of the ethylene glycol component in the total diol component, are less than the above ranges, the aligned crystallization of the molecular chains by stretching at the time of molding a bottle, etc., tends to be inadequate, whereby the mechanical strength, the gas barrier property, the heat resistance, etc., as a molded product such as a bottle, tend to be inadequate.

And, in the polyester resin of the present invention, it is essential that the content of copolymerizable components other than the terephthalic acid component and the ethylene glycol component is not more than 4 mol %, preferably not more than 3 mol %, further preferably not more than 2 mol %. If the content of copolymerizable components exceeds the above range, it tends to be difficult to obtain a molded product which is excellent in e.g. the aroma-retention property, etc., and in which the acetaldehyde content is reduced.

Further, the ester-forming derivative of terephthalic acid may, for example, be a $C_{1-4}$ alkyl ester, a halogenated product, etc. Further, dicarboxylic acid components other than terephthalic acid or its ester-forming derivative, may, for example, be an aromatic dicarboxylic acid such as phthalic acid, isophthalic acid, dibromoisophthalic acid, sodium sulfoisophthalate, phenylene dioxydicarboxylic acid, 4,4'-diphenyl dicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid or 2,6-naphthalene dicarboxylic acid, an alicyclic dicarboxylic acid such as hexahydroterephthalic acid or hexahydroisophthalic acid, and an aliphatic dicarboxylic acid such as succinic acid, glutaric acid, adipic acid, pimelic acid, suberic acid, azelaic acid, sebacic acid, undecadicarboxylic acid or dodecacarboxylic acid, as well as a $C_{1-4}$ alkyl ester thereof, and a halogenated product thereof. Among them, in the present invention, isophthalic acid or its ester-forming derivative is preferred, and the proportion in the total dicarboxylic acid component is preferably from 0.1 to 3 mol %. If isophthalic acid is within this range, the solid phase polycondensation rate is high, and reduction of the acetaldehyde content in a molded product of the obtainable resin tends to be facilitated.

Further, as the diol component other than ethylene glycol, diethylene glycol formed as a by-product in the reaction system may be mentioned, and the proportion of such diethylene glycol in the total diol component is preferably not more than 3 mol %, more preferably from 1 to 3 mol %, inclusive of one added as a copolymerizable component from outside the system. If diethylene glycol exceeds this range, a problem tends to occur such that when the obtainable resin is formed into a molded product, the gas barrier property decreases, or it tends to be difficult to reduce the acetaldehyde content. Further, other diol components may, for example, be an aliphatic diol such as trimethylene glycol, tetramethylene glycol, pentamethylene glycol, hexamethylene glycol, octamethylene glycol, decamethylene glycol, neopentyl glycol, 2-ethyl-2-butyl-1,3-propane diol, polyethylene glycol or polytetramethylene ether glycol, an alicyclic diol such as 1,2-cyclohexanediol, 1,4-cyclohexanediol, 1,1-cyclohexanedimethylol, 1,4-cyclohexanedimethylol or 2,5-norbornanedimethylol, and an aromatic diol such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone or bis(4-β-hydroxyethoxyphenyl)sulfonic acid, as well as an ethylene oxide adduct or a propylene oxide adduct, of 2,2-bis(4'-hydroxyphenyl)propane.

Further, copolymerizable components may, for example, be a hydroxycarboxylic acid or an alkoxycarboxylic acid, such as glycolic acid, p-hydroxybenzoic acid or p-β-hydroxyethoxybenzoic acid, a single functional component such as stearyl alcohol, heneycosanol, octacosanol, benzyl alcohol, stearic acid, behenic acid, benzoic acid, t-butyl benzoic acid or benzoylbenzoic acid, and a polyfunctional component with at least trifunctional, such as tricarbarylic acid, trimellitic acid, trimesic acid, pyromellitic acid, naphthalene tetracarboxylic acid, gallic acid, trimethylolethane, trimethylolpropane, glycerol, pentaerythritol or sugar ester.

The polyester resin of the present invention is such that in a molded product with a thickness of 3.5 mm injection-molded at 280° C., the difference between the absorbance at a wavelength of 395 nm and the absorbance at a wavelength of 800 nm is at least 0.08, and this difference in absorbance is preferably at least 0.15, more preferably at least 0.20. If this difference in absorbance is less than the above range, it tends to be difficult to obtain a molded product excellent in the ultraviolet shielding property. Further, in a molded product having a thickness of 3.5 mm injection-molded at 280° C., the difference between the absorbance at a wavelength of 500 nm and the absorbance at a wavelength of 800 nm is at most 0.05, and this difference in absorbance is preferably at most 0.04, more preferably at most 0.03. If this difference in absorbance is less than the above range, it tends to be difficult to obtain a molded product excellent in the color tone. Here, the absorbance of a molded product is a value at each wavelength when measured by means of an ultraviolet visible light absorption photometer within a wavelength range of from 300 to 800 nm at a scanning speed of 127 nm/min.

Further, the polyester resin of the present invention is such that the temperature-rising crystallization temperature (Tc) of the resin in the molded product after the injection molding at 280° C., is preferably from 150 to 180° C., more preferably from 155 to 165° C., particularly preferably from 157 to 164° C. This temperature-rising crystallization temperature (Tc) relates to the crystallization rate of the mouth stopper portion, etc. at the time of molding a bottle, and if the temperature-rising crystallization temperature (Tc) is either less than the above range or more than the above range, the dimensional stability at the mouth stopper portion deteriorates as a bottle, and a problem such as leakage of a gas from the mouth stopper portion or deterioration of the aroma-retention property, tends to result. Here, the temperature-rising crystallization temperature (Tc) is one obtained by measuring the crystallization peak temperature observed in the temperature rise when the temperature was raised from 20° C. to 285° C. at a rate of 20° C./min in a nitrogen stream by means of a differential scanning calorimeter.

Further, the polyester resin of the present invention is such that the intrinsic viscosity ($[\eta]$) is preferably from 0.70 to 0.90 dl/g, more preferably from 0.70 to 0.80 dl/g, as a value measured at 30° C. in a solution in a mixed solvent of phenol/tetrachloroethane (weight ratio: 1/1). If the intrinsic viscosity ($[\eta]$) is less than the above range, the mechanical strength tends to be inadequate as a molded product such as a bottle. On the other hand, if it exceeds the above range, the moldability for a bottle or the like tends to deteriorate, and it tends to be difficult to control production of acetaldehyde, etc. as by-products at the time of the melt molding. Further, as the color tone, the color coordinate value b of the Hunter's color difference formula in the Lab color system as disclosed in Reference 1 in JIS Z8730, is preferably not more than 4, more preferably from −5 to 2. If value b exceeds the above range, the color tone tends to be yellowish as a molded product such as a bottle. Further, the cyclic trimer content (CT) is preferably not more than 0.50 wt %, more preferably not more than 0.40 wt %. If the cyclic trimer content (CT) exceeds the above range, contamination of the mold tends to occur during molding of a bottle, etc.

Further, the acetaldehyde content ($AA_1$) is preferably not more than 5.0 ppm, more preferably not more than 3.0 ppm. Further, the acetaldehyde content ($AA_2$) of the resin in a molded product after injection-molded at 280° C., is preferably not more than 20 ppm, more preferably not more than 18 ppm, particularly preferably not more than 15 ppm. If the acetaldehyde content ($AA_1$) and the acetaldehyde content ($AA_2$) exceed the above ranges, it tends to be difficult to eliminate an influence over the taste, the aroma, etc. of the content, as a molded product such as bottle. Further, the haze of a molded product with a thickness of 5 mm after the injection molding at 280° C. is preferably not more than 10%, more preferably not more than 8%.

And, in the present invention, in order to bring the above-mentioned content of copolymerizable components, the intrinsic viscosity ($[\eta]$), color coordinate value b, the cyclic trimer content (CT), the acetaldehyde content ($AA_1$), as well as the absorbance of the molded product after the injection molding at 280° C., the temperature-rising crystallization temperature (Tc), the acetaldehyde content ($AA_2$), and the haze, etc. within the above ranges, it is essential that the polycondensation of the polyester resin is carried out in the presence of (1) a compound of at least one member selected from the group consisting of titanium group elements in Group 4A of the periodic table. Accordingly, the polyester resin of the present invention contains (1) a compound of at least one member selected from the group consisting of titanium group elements in Group 4A of the periodic table.

Here, (1) the compound of a titanium group element of Group 4A of the periodic table, i.e. titanium, zirconium or hafnium, may, for example, be an oxide, a hydroxide, an alkoxide, an acetate, a carbonate, a oxalate and a halide of such an element. Among compounds of such elements, a titanium compound is preferred. Specifically, the titanium compound may, for example, be a titanium alkoxide such as tetra-n-propyl titanate, tetra-1-propyl titanate, tetra-n-butyl titanate, tetra-n-butyl titanate tetramer, tetra-t-butyl titanate, tetracyclohexyl titanate, tetraphenyl titanate or tetrabenzyl titanate, a titanium oxide obtainable by the hydrolysis of a titanium alkoxide, a titanium/silicon or zirconium double oxide obtainable by the hydrolysis of a mixture of a titanium alkoxide with a silicon alkoxide or a zirconium alkoxide, titanium acetate, titanium oxalate, titanium potassium oxalate, titanium sodium oxalate, potassium titanate, sodium titanate, a titanic acid/aluminum hydroxide mixture, titanium chloride, a titanium chloride/aluminum chloride mixture, titanium bromide, titanium fluoride, potassium hexafluorotitanate, cobalt hexafluorotitanate, manganese hexafluorotitanate, ammonium hexafluorotitanate, or titanium acetylacetonate. Among them, a titanium alkoxide such as tetra-n-propyl titanate, tetra-1-propyl titanate or tetra-n-butyl titanate, titanium oxalate or titanium potassium oxalate, is preferred, and tetra-n-butyl titanate is particularly preferred.

Further, with respect to the polycondensation, from the viewpoint of the polycondensability, reduction of by-products such as acetaldehyde, a cyclic trimer, etc. in the obtainable resin and the color tone, as well as the absorbance of the molded product, the temperature-rising crystallization temperature, etc., one polycondensed in the coexistence of (2) a compound of at least one element selected from the group consisting of metal elements of Group 1A of the periodic table, elements of Group 2A of the periodic table, manganese, iron and cobalt, and (3) a phosphorus compound, is preferred. Accordingly, the polyester resin of the present invention preferably contains (2) the compound of at least one element selected from the group consisting of metal elements of Group 1A of the periodic table, elements of Group 2A of the periodic table, manganese, iron and cobalt, and (3) the phosphorus compound.

Here, (2) the compound of at least one element selected from the group consisting of metal elements of Group 1A of the periodic table, elements of Group 2A of the periodic table, manganese, iron and cobalt, may, for example, be an oxide, a hydroxide, an alkoxide, an acetate, a carbonate, an oxalate, a halide, etc. of lithium, sodium, potassium, magnesium, calcium, manganese, iron, cobalt, etc. Specifically, it may, for example, be lithium acetate, sodium acetate, potassium acetate, magnesium oxide, magnesium hydroxide, magnesium alkoxide, magnesium acetate, magnesium carbonate, calcium oxide, calcium hydroxide, calcium acetate, calcium carbonate, manganese oxide, manganese hydroxide, manganese acetate, ferric acetate, cobalt formate, cobalt acetate, cobalt oxalate, cobalt carbonate, cobalt bromide or cobalt acetylacetonate. Among them, a magnesium compound or a manganese compound is preferred. Particularly preferred is a magnesium compound, and magnesium acetate is especially preferred.

Further, (3) the phosphorus compound may, specifically, be a pentavalent phosphorus compound, such as orthophosphoric acid, polyphosphoric acid or a phosphoric acid ester such as trimethyl phosphate, triethyl phosphate, tri-n-butyl phosphate, trioctyl phosphate, triphenyl phosphate, tricresyl phosphate, tris(triethylene glycol) phosphate, methyl acid phosphate, ethyl acid phosphate, isopropyl acid phosphate, butyl acid phosphate, monobutyl phosphate, dibutyl phosphate, dioctyl phosphate or triethylene glycol acid phosphate, phosphorous acid, hypophosphorous acid, a phosphorous acid ester such as trimethyl phosphite, diethyl phosphite, triethyl phosphite, trisdodecyl phosphite, trisnonyldecyl phosphite, ethyl diethyl phosphonoacetate or triphenyl phosphite, or a trivalent phosphorus compound such as a metal salt of lithium, sodium, potassium, etc. Among them, a phosphoric acid ester as a pentavalent phosphorus compound is preferred. Particularly preferred is trimethyl phosphate or ethyl acid phosphate.

In the present invention, the respective amounts of (1) the above compound of at least one member selected from the group consisting of titanium group elements in Group 4A of the periodic table, (2) the above compound of at least one element selected from the group consisting of metal elements of Group 1A of the periodic table, elements of Group 2A of the periodic table, manganese, iron and cobalt, and (3) the above phosphorus compound, used at the time of polycondensation, and the respective contents in the resulting polyester resin, are preferably from 0.002 to 1 mol, more preferably from 0.002 to 0.5 mol, as the total amount (T) of atoms of the compound (1), preferably from 0.04 to 5 mol, more preferably from 0.04 to 3 mol, as the total amount (M) of atoms of the compound (2), and preferably from 0.02 to 4 mol, more preferably from 0.02 to 2 mol, as the total amount (P) of atoms of the compound (3), per 1 ton of the polyester resin.

When the total amount (T) of atoms of the compound (1), the total amount (M) of atoms of the compound (2) and the total amount (P) of atoms of the compound (3) are within the above ranges, the ultraviolet shielding properties tend to be excellent. Further, particularly, in order to reduce the acetaldehyde content in the molded product and to improve the polycondensability, the total amount (T) of atoms of the compound (1) is more preferably from 0.02 to 0.2 mol, particularly preferably from 0.04 to 0.15 mol, the total amount (M) of atoms of the compound (2) is more preferably from 0.04 to 0.6 mol, particularly preferably from 0.05 to 0.4 mol, most preferably from 0.1 to 0.3 mol, and the total amount (P) of atoms of the compound (3) is more preferably from 0.02 to 0.4 mol, particularly preferably from 0.1 to 0.3 mol, per 1 ton of the polyester resin.

Further, once the amounts of the respective compounds i.e. (1) the compound of at least one member selected from the group consisting of titanium group elements in Group 4A of the periodic table, (2) the compound of at least one element selected from the group consisting of metal elements of Group 1A of the periodic table, elements of Group 2A of the periodic table, manganese, iron and cobalt, and (3) the phosphorus compound, satisfy the molar amounts of the above ranges as the total amount (T) of atoms of the compound (1), as the total amount (M) of atoms of the compound (2), and as the total amount (P) of atoms of the compound (3), it is preferred that the molar ratio [P/T] of the total amount (P) of atoms of the compound (3) to the total amount (T) of atoms of the compound (1) is from 0.1 to 10, more preferably from 1 to 7, particularly preferably from 2 to 5, and the molar ratio [M/T] of the total amount (M) of atoms of the compound (2) to the total amount (T) of atoms of the compound (1) is from 0.1 to 10, more preferably from 0.5 to 7, particularly preferably from 3 to 5. Further, for a polyester resin particularly excellent in the ultraviolet shielding property, it is preferred that the molar ratio [P/M] of the total amount (P) of atoms of the compound (3) to the total amount (M) of atoms of the compound (2), is more than 0 to 10, more preferably from 1 to 5, particularly preferably from 2 to 4, and the molar ratio [P/(T+M)] of the total amount (P) of atoms of the compound (3) to the sum of the total amount (T) of atoms of the compound (1) and the total amount (M) of atoms of the compound (2), is more than 0 to 10, more preferably from 0.5 to 5, particularly preferably from 1 to 3.

If the molar ratio [P/T] is less than the above range, the obtainable resin tends to be yellowish, and thus the color tone tends to deteriorate. On the other hand, if it exceeds the above range, the melt polycondensability and the solid phase polycondensability, which will be described hereinafter, tend to deteriorate simultaneously. Further, if the above molar ratio [M/T] is less than the above range, the melt polycondensability and the solid phase polycondensability, which will be described hereinafter, will deteriorate simultaneously, and it tends to be difficult to reduce the acetaldehyde content in the molded product of the resulting resin. On the other hand, if it exceeds the above range, the solid phase polycondensability which will be described hereinafter, tends to deteriorate.

Further, in the present invention, during the polycondensation, metal compounds other than the above-mentioned respective compounds, may be present within a range not to impair the effects of the present invention, and accordingly, such metal compounds may be contained in the polyester resin of the present invention. In such a case, the metal compounds may, for example, be compounds such as oxides, hydroxides, alkoxides, carbonates, phosphates, carboxylates or halides of aluminum, chromium, nickel, copper, zinc, germanium, molybdenum, silver, tin, lanthanum, cerium, tungsten, gold, etc. The above-mentioned respective compounds and other compounds are preferably ones soluble in water or an alcohol such as ethylene glycol.

The polyester resin of the present invention is produced by polycondensing a dicarboxylic acid component containing the above terephthalic acid or its ester-forming derivative as the main component and a diol component containing ethylene glycol as the main component in the presence of (1) the compound of at least one element selected from the group consisting of titanium group elements of Group 4A of the periodic table, preferably in the coexistence of (2) the compound of at least one element selected from the group consisting of metal elements of Group 1A of the periodic table, elements of Group 2A of the periodic table, manganese, iron and cobalt, and (3) the phosphorus compound, via an esterification reaction or an ester exchange reaction, but basically in accordance with a common process for producing a polyester resin. Namely, it is produced by introducing into a slurry preparation tank the above dicarboxylic acid component containing the above terephthalic acid or its ester-forming derivative as the main component and the diol component containing ethylene glycol as the main component together with optional copolymerizable components, etc., followed by mixing with stirring to obtain a raw material slurry, subjecting it to an esterification reaction for from about 1 to 10 hours in an esterification reactor under atmospheric pressure or elevated pressure under heating with stirring or to an ester exchange reaction in the presence of an ester exchange catalyst, then transferring the obtained polyester low molecular weight product as the esterification reaction product or the ester exchange reaction product to a polycondensation tank, and melt polycondensing it in the presence of the above-mentioned compounds under atmospheric pressure or gradually reduced pressure under heating with stirring for about 1 to 20 hours. These operations may be carried out by a continuous system or by a batch system.

At that time, preparation of the raw material slurry comprising the dicarboxylic acid component containing terephthalic acid or its ester-forming derivative as the main component and the diol component containing ethylene glycol as the main component, is carried out preferably by adjusting the molar ratio of the total diol component to the total dicarboxylic acid component to be within a range of from 1.0 to 2.5, more preferably within a range of from 1.03 to 1.7.

Further, the esterification reaction is carried out by means of a single esterification reactor or a multi-stage reaction apparatus having a plurality of esterification reactors connected in series, under reflux of ethylene glycol, while removing water formed by the reaction and excess ethylene glycol out of the system. At that time, the esterification ratio (the proportion of the esterified by a reaction with the diol component among the total carboxyl groups of the raw material dicarboxylic acid component) of the polyester low molecular weight product as the esterification reaction product or the ester exchange reaction product, is preferably at least 95%. Further, the number average molecular weight of the low molecular weight product is preferably from 500 to 5,000. Further, in the case of the ester exchange reaction, it is necessary to employ an ester exchange catalyst, whereby the transparency of the resulting resin usually tends to be poor. Accordingly, in the present invention, the product is preferably one produced via the esterification reaction.

With respect to the reaction conditions in the esterification reaction, in the case of a single esterification reactor, the temperature is usually at a level of from 240 to 280° C., the relative pressure to the atmosphere is usually at a level of from 0 to 400 kPa (from 0 to 4 kg/cm²G), and the reaction time is from about 1 to 10 hours with stirring. In the case of a plurality of esterification reactors, the reaction temperature in the esterification reactor for the first stage is usually from 240 to 270° C., preferably from 245 to 265° C., and the relative pressure to the atmospheric pressure is usually from 5 to 300 kPa (from 0.05 to 3 kg/cm²G), preferably from 10 to 200 kPa (from 0.1 to 2 kg/cm²G), and the reaction temperature in the final stage is usually from 250 to 280° C., preferably from 255 to 275° C., and the relative pressure to the atmospheric pressure is usually from 0 to 150 kPa (from 0 to 1.5 kg/cm²G), preferably from 0 to 130 kPa (from 0 to 1.3 kg/cm²G). Further, the esterification ratio in each stage is preferably adjusted so that its increase will be equal.

Further, in the esterification reaction, it is possible to suppress production of diethylene glycol as a by-product from ethylene glycol, by adding a small amount of e.g. a tertiary amine such as triethylamine, tri-n-butylamine or benzyl dimethylamine, a quaternary ammonium hydroxide such as tetraethylammonium hydroxide, tetra-n-butylammonium hydroxide or trimethylbenzylammonium hydroxide, or a basic compound such as lithium carbonate, sodium carbonate, potassium carbonate or sodium acetate.

Further, the melt polycondensation is carried out under reduced pressure, while distilling off formed ethylene glycol out of the system, by means of a single melt polymerization tank, or a multi-stage reaction apparatus having a plurality of melt polycondensation tanks connected in series, for example, an apparatus comprising a perfect mixing type reactor equipped with stirring vanes for the first stage and horizontal plug flow type reactors equipped with stirring vanes for the second and third stages.

With respect to the reaction conditions in the melt polycondensation, in the case of a single polycondensation tank, the temperature is usually from about 250 to 290° C., the pressure is gradually reduced from the atmospheric pressure, so that finally, the absolute pressure will be usually at a level of from 1.3 to 0.013 kPa (from 10 to 0.1 Torr), and the reaction time is from about 1 to 20 hours with stirring. Whereas, in the case of a plurality of polycondensation tanks, the reaction temperature in the polycondensation tank for the first stage is usually from 250 to 290° C., preferably from 260 to 280° C. and the absolute pressure is usually from 65 to 1.3 kPa (from 500 to 10 Torr), preferably from 26 to 2 kPa (from 200 to 15 Torr), and the reaction temperature in the final stage is usually from 265 to 300° C., preferably from 270 to 295° C., and the absolute pressure is usually from 1.3 to 0.013 kPa (from 10 to 0.1 Torr), preferably from 0.65 to 0.065 kPa (from 5 to 0.5 Torr). The reaction conditions for an intermediate stage are selected to be intermediate conditions thereof, and for example, in a three stage reaction apparatus, the reaction temperature in the second stage is usually from 265 to 295° C., preferably from 270 to 285° C., and the absolute pressure is usually from 6.5 to 0.13 kPa (from 50 to 1 Torr), preferably from 4 to 0.26 kPa (from 30 to 2 Torr).

Further, at the time of polycondensation, timing for addition of (1) the compound of at least one element selected from the group consisting of titanium group elements of Group 4A of the periodic table, (2) the compound of at least one element selected from the group consisting of metal elements of Group 1A of the periodic table, elements of Group 2A of the periodic table, manganese, iron and cobalt, and (3) the phosphorus compound, to the reaction system, may be at any one of an optional stage of a step of preparing a slurry of the starting material terephthalic acid or its ester-forming derivative, ethylene glycol, and optionally employed other dicarboxylic acid components, or a step of the esterification reaction or the ester exchange reaction, or in the initial stage of the melt polycondensation step. However, the compounds (1) and (2) are added preferably in the step of the esterification reaction or the ester exchange reaction, or in the stage of transportation to the melt polycondensation step, and it is also preferred that they are added at a stage where the esterification ratio of the esterification reaction product or the ester exchange reaction product reaches at least 90%. Further, it is preferred that the compound (1) is added later than the compound (2). Further, it is preferred that the compound (3) is added at a stage where the esterification ratio of the esterification reaction product or the ester exchange reaction product is less than 90%.

With respect to the specific steps for addition of the respective compounds, it is preferred, for example, that the compound (1) is added to the esterification reaction tank for the final stage in the multi-stage reaction apparatus or to the esterification reaction product or the ester exchange reaction product in the stage for transportation to the melt polycondensation step, and the compound (2) is added to the esterification reaction tank for the final stage in the multi-stage reaction apparatus. Further, the compound (3) is preferably added to the slurry preparation tank or the esterification reaction tank for the first stage, particularly preferably to the slurry preparation tank. Namely, in the present invention, it is preferred to set the order of addition of the respective compounds (1), (2) and (3) to the reaction system to be (3) then (2) and then (3).

By setting the timing of addition and the order of addition of the respective compounds (1), (2) and (3) to the reaction system as mentioned above, the thermal stability of the resin can be improved, and production of diethylene glycol as a by-product in the reaction system which causes production of acetaldehyde, etc. as by-products during the melt molding, can be suppressed, and further, it is possible to effectively obtain the effects for improving the melt polycondensability and the solid phase polycondensability.

Further, addition of the respective compounds (1), (2) and (3) to the reaction system at the time of the polycondensation, is preferably carried out in the form of a solution in e.g. water or an alcohol such as ethylene glycol. In an ethylene glycol solution in a case where a titanium compound is used as the compound (1), it is preferred to adjust the concentration of titanium atoms to be from 0.01 to 0.3 wt % and the water concentration to be from 0.1 to 1 wt %, from the viewpoint of the dispersibility of the titanium compound in the reaction system and the improvement of the melt polycondensability and the solid phase polycondensability thereby obtainable.

Further, the reaction time for the melt polycondensation is usually preferably at most 3.5 hours. If the reaction time exceeds it, it tends to be difficult to reduce the aldehyde content in the resulting resin and the amount of acetaldehyde by-product during the melt molding.

The polyester resin obtainable by the above melt polycondensation is such that the intrinsic viscosity ($[\eta_1]$) is preferably from 0.35 to 0.75 dl/g, more preferably from 0.50 to 0.60 dl/g, as a value measured at 30° C. in a solution in a mixed solvent of phenol/tetrachloroethane (weight ratio: 1/1). If the intrinsic viscosity ($[\eta_1]$) is less than the above range, the withdrawing property from the polycondensation tank, which will be described hereinafter, tends to be poor. On the other hand, if it exceeds the above range, it tends to be difficult to reduce the acetaldehyde content in the resulting resin. Further, the melt polycondensation velocity ($V_1$) as a value obtained by dividing the above-mentioned intrinsic viscosity ($[\eta_1]$) of the resulting polyester resin by the above-mentioned reaction time, is preferably at least 0.15 dl/g/hr.

Further, the resin obtained by the melt polycondensation is usually withdrawn in the form of a strand from a discharge outlet provided at the bottom of the polycondensation tank and, while being cooled by water or after being cooled by water, cut by a cutter into particles such as pellets or chips. Further, such particles after the melt polycondensation, are usually heated at a temperature of from about 60 to 180° C. in an atmosphere of an inert gas such as nitrogen, carbon dioxide or argon, or in a steam atmosphere, or in a steam-containing inert gas atmosphere, to crystallize the surface of the resin particles and then subjected to solid phase polycondensation by heat treatment at a low temperature of from immediately below the adhesive temperature of the resin to 80° C. in an inert gas atmosphere or/and under a reduced pressure of from 1.3 to 0.013 kPa (from 10 to 0.1 Torr), usually for a period of at most 50 hours, while letting the particles flow not to fuse one another. By this solid phase polycondensation, it is possible to further increase the polymerization degree and to reduce by-products such as acetaldehyde, a cyclic trimer, etc.

The polyester resin obtainable by the above solid phase polycondensation is such that the intrinsic viscosity ($[\eta_2]$) is preferably from 0.70 to 0.90 dl/g, more preferably from 0.70 to 0.80 dl/g, as a value measured at 30° C. in a solution in a mixed solvent of phenol/tetrachloroethane (weight ratio: 1/1). Further, the solid phase polycondensation velocity ($V_2$) as a value obtained by dividing the difference ($[\eta_2]-[\eta_1]$) between the above intrinsic viscosity ($[\eta_2]$) of the obtainable solid phase polycondensation resin and the intrinsic viscosity ($[\eta_1]$) of the above-mentioned melt polycondensation resin, by the above-mentioned reaction time, is preferably from 0.008 to 0.015 dl/g/hr. Further, the ratio ($V_2/V_1$) of this solid phase polycondensation velocity to the above-mentioned melt polycondensation velocity is preferably within a range of from 0.04 to 0.07, more preferably within a range of from 0.05 to 0.07.

Further, for the purpose of improving the thermal stability, reduction of by-products such as acetaldehyde, a cyclic trimer, etc. during the molding, etc., the resin obtained by the above melt polycondensation or the solid phase polycondensation may usually be subjected to water treatment of dipping it in warm water of at least 40° C. for at least 10 minutes, or steam treatment of contacting it with steam or a steam-containing gas of at least 60° C. for at least 30 minutes, or treatment with an organic solvent, an acidic aqueous solution of e.g. various mineral acids, organic acids or phosphoric acids, or treatment by an alkaline aqueous solution or an organic solvent solution, of a Group 1A metal, a Group 2A metal or an amine.

Further, the polyester resin of the present invention may contain a crystalline thermoplastic resin different from the polyester resin in a content of from 0.0001 to 1,000 ppm, preferably from 0.0005 to 100 ppm, more preferably from 0.001 to 10 ppm, as the case requires, to adjust the temperature-rising crystallization temperature (Tc) of the resin in the above-mentioned molded product after injection molding to the above-mentioned range. As such a crystalline thermoplastic resin, a polyolefin resin or a polyamide resin may be mentioned as a typical example.

The polyolefin resin may, for example, be a homopolymer of an α-olefin having from about 2 to 8 carbon atoms, such as ethylene, propylene or butene-1, or a copolymer of such an α-olefin with another α-olefin having from 2 to 20 carbon atoms such as ethylene, propylene, 1-butene, 3-methyl-1-butene, 1-pentene, 4-methyl-1-pentene, 1-hexene, 1-octene or 1-decene, or with a vinyl compound such as vinyl acetate, acrylic acid, methacrylic acid, an acrylate, a methacrylate, vinyl chloride or styrene. Specifically, it may, for example, be an ethylene resin such as an ethylene homopolymer such as a low, intermediate or high density polyethylene, an ethylene/propylene copolymer, an ethylene/1-butene copolymer, an ethylene/4-methyl-1-pentene copolymer, an ethylene/1-hexene copolymer, an ethylene/1-octene copolymer, an ethylene/vinyl acetate copolymer, an ethylene/acrylic acid copolymer, an ethylene/methacrylic acid copolymer or an ethylene/ethyl acrylate copolymer, a propylene resin such as a propylene homopolymer, a propylene/ethylene copolymer or a propylene/ethylene/1-butene copolymer, and a 1-butene resin such as a 1-butene homopolymer, a 1-butene/ethylene copolymer or a 1-butene/propylene copolymer.

Further, the polyamide resin may, for example, be a polymer of a lactam such as butyrolactam, δ-valerolactam, ε-caprolactam, enantholactam or ω-lauryllactam, a polymer of an amino acid such as 6-amino caproic acid, 7-amino heptanoic acid, 8-amino octanoic acid, 9-amino nonanoic acid, 11-amino undecanoic acid or 12-amino dodecanoic acid, a polycondensate of a diamine, such as an aliphatic diamine such as 1,4-butane diamine, 1,5-pentane diamine, 1,5-hexane diamine, 1,6-hexane diamine, 1,9-nonane diamine, 1,11-undeca diamine, 1,12-dodecane diamine or α,ω-diaminopolypropylene glycol, an alicyclic diamine such as 1,3- or 1,4-bis(aminomethyl)cyclohexane or bis(p-aminocyclohexylmethane), or an aromatic diamine such as m- or p-xylylene diamine, with a dicarboxylic acid, such as an aliphatic dicarboxylic acid such as glutaric acid, adipic acid, suberic acid, sebacic acid or dodecanoic diacid, an alicyclic dicarboxylic acid such as cyclohexane dicarboxylic acid, or an aromatic dicarboxylic acid such as terephthalic acid or isophthalic acid, or a copolymer thereof. Specifically, for example, nylon 4, nylon 6, nylon 7, nylon 8, nylon 9, nylon 11, nylon 12, nylon 66, nylon 69, nylon 610, nylon 611, nylon 612, nylon 6T, nylon 6I, nylon MXD6, nylon 6/66, nylon 6/610, nylon 6/12, nylon 6/6T or nylon 6I/6T may be mentioned.

In the present invention, the above crystalline thermoplastic resin may be incorporated to the polyester resin by a common method such as a method of directly adding and melt mixing or a method of adding and melt mixing as a master batch the above crystalline thermoplastic resin to the above polyester resin so that its content becomes within the above-mentioned range. Otherwise, a method may be employed wherein the above crystalline thermoplastic resin is directly added as a powder at a production stage of the above polyester resin, for example, at any stage of e.g. during the melt polycondensation (the starting materials, slurry, catalyst, etc.), immediately after the melt polycondensation, immediately after the preliminary crystallization, during the solid phase polycondensation or immediately after the solid phase polycondensation, or during a period after the production stage until the molding stage, or a liquid such as water having the powder dispersed therein, is contacted with the polyester resin chips, a gas such as air having the powder included, is contacted with the polyester resin chips, or the polyester resin chips are contacted to a component made of the crystalline thermoplastic resin under a flowing condition, followed by melt kneading. Among the latter methods, a method is preferred in which the crystalline thermoplastic resin is incorporated to air for pneumatic transportation at the time of pneumatic transportation to a preliminary crystallization machine or at the time of pneumatic transportation to a solid polycondensation tank, of chips of the polyester resin after the melt polycondensation, or at the time of pneumatic transportation to a storage tank or at the time of pneumatic transportation to a molding machine, of chips after the solid phase polycondensation.

Further, in the present invention, the polyester resin may contain, for example, an ultraviolet absorber of e.g. a benzophenone type such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone or 2,2'-dihydroxy-4,4'-dimethoxybenzophenone, a benzotriazole type such as 2-(2'-hydroxy-5'-methylphenyl)benzotriazole, 2-(2'-hydroxy-5'-butylphenyl)benzotriazole, 2-(2'-hydroxy-5'-t-octylphenyl) benzotriazole, 2-(2'-hydroxy-3',5'-di-t-butylphenyl) benzotriazole, 2-(2'-hydroxy-3',5'-di-t-amylphenyl) benzotriazole, 2-(2'-hydroxy-3'-t-butyl-5'-methylphenyl)-5-chlorobenzotriazole or 2-(2'-hydroxy-3',5'-di-t-butylphenyl)-5-chlorobenzotriazole, a salicylate type such as phenyl salicylate, p-t-butylphenyl salicylate or p-octylphenyl salicylate, or a cyanoacrylate type such as 2-ethylhexyl-2-cyano-3,3'-diphenylacryalte, and an antioxidant, a photostabilizer, an antistatic agent, a lubricant, a blocking preventive agent, an antifogging agent, a nucleating agent, a plasticizer, a colorant, a filler, etc.

The polyester resin of the present invention may, for example, be molded into a preform by injection molding, followed by stretch blow molding, or molded into a parison by extrusion, followed by blow molding, to obtain a bottle or the like, or it may be formed into a sheet by extrusion, followed by heat forming to obtain a tray, a container or the like, or said sheet may be biaxially stretched to obtain a film or the like, which will be particularly useful in the field of packaging beverage products. Among them, it is particularly suitable for molding the preform obtained by injection molding into a bottle by a biaxially stretching blow molding method, and it is suitable, for example, for a container for e.g. a carbonated beverage, an alcoholic beverage, or a liquid seasoning such as soy sauce, a regular sauce, Japanese sweet rice wine for cooking or dressing, or after heat setting, for a container which is required to have an aroma-retention property and an ultraviolet shielding property and which is required to be free from an influence over the taste, fragrance, etc., of a beverage such as a fruit juice beverage, a vitamin beverage, a flavor tea or mineral water.

Now, the present invention will be described in further detail with reference to Examples. However, the present invention is by no means restricted by the following Examples.

EXAMPLE 1

Slurries of 43 kg (260 mol) of terephthalic acid and 19 kg (312 mol) of ethylene glycol were continuously supplied over a period of 4 hours to an esterification reaction tank having about 60 kg of bis(hydroxyethyl) terephthalate previously charged and maintained at a temperature of 250° C. and a pressure of $1.2 \times 10^5$ Pa, and even after completion of the supply, the esterification reaction was further carried out for one hour. About one half of this esterification reaction product was transferred to a polycondensation tank.

Then, to the polycondensation tank to which the esterification reaction product was transferred, from its pipe, ethyl acid phosphate, magnesium acetate and tetra-n-butoxy titanium were sequentially added in their ethylene glycol solutions, respectively, with intervals of 5 minutes, so that 0.387 mol of phosphorus atoms (P), 0.062 mol of magnesium atoms (Mg) and 0.063 mol of titanium atoms (Ti) would remain per 1 ton of the resulting polyester resin. Then, the interior of the system was heated from 250° C. to 280° C. over a period of 2 hours and 30 minutes, and at the same time, the pressure was reduced from normal pressure to $4 \times 10^2$ Pa over a period of one hour, and while maintaining the same pressure, melt polycondensation was carried out for a period of time until the intrinsic viscosity of the obtained resin became 0.55 dl/g. The polymer was withdrawn in the form of a strand from the discharge outlet provided at the bottom of the polycondensation tank, cooled with water and then cut into chips to obtain about 50 kg of a polyethylene terephthalate resin.

Then, the obtained polyester resin chips were continuously supplied into an agitation crystallizer maintained at about 160° C. so that the retention time would be about 5 minutes, for crystallization, then dried at 160° C. for 2 hours in a nitrogen stream of 40 l/min in an inert oven ("IPHH-201 model", manufactured by ESPEC), and heated at 210° C. for a period of time until the intrinsic viscosity became 0.74 dl/g, for solid phase polycondensation.

With respect to the obtained polyester resin chips, the contents of copolymerizable components, the contents of metal atoms of the respective metal compounds, the intrinsic viscosity ($[\eta]$), the color coordinate value b as the color tone and the cyclic trimer content (CT) were measured by the following methods, and the results are shown in Table 1.

Content of Copolymerizable Component

With respect to a solution having a resin sample dissolved at a concentration of 3 wt % in a mixed solvent of deuterated chloroform/hexafluoroisopropanol (weight ratio: 7/3), $^1$H-NMR was measured by a nuclear magnetic resonance apparatus ("JNM-EX270 model", manufactured by Nippon Denshi K.K.), and the respective peaks were identified, whereupon from the integral value of a peak, the content of the copolymerizable component was calculated.

Contents of Metal Atoms 2.5 g of a resin sample was ashed and completely decomposed by hydrogen peroxide in the presence of sulfuric acid in accordance with a usual method and then adjusted by distilled water to a constant volume of 50 ml, and with respect to this sample, quantitative analysis was carried out by means of a plasma emission spectrometer (ICP-AES "JY46P model", manufactured by JOBIN YVON COMPANY), whereupon the molar amount per 1 ton of the polyester resin was calculated.

Intrinsic Viscosity ($[\eta]$)

0.25 g of a freeze-pulverized resin sample was dissolved at a concentration (c) of 1.0 g/dl in a mixed solvent of phenol/tetrachloroethane (weight ratio: 1/1), at 110° C. for 30 minutes in the case of a melt polycondensate resin, or at 120° C. for 30 minutes in the case of a solid phase polycondensate resin, whereupon by means of an Ubbellohde capillary viscometer, the relative viscosity ($\eta$ rel) to the solvent was measured at 30° C. A ratio ($\eta$ sp/c) of the specific viscosity ($\eta$ sp) obtained from this relative viscosity ($\eta$ rel)−1, to the concentration (c), was obtained. In a similar manner, the corresponding ratios ($\eta$ sp/c) were obtained when the concentration (c) was changed to 0.5 g/dl, 0.2 g/dl and 0.1 g/dl, respectively. From these values, a ratio ($\eta$ sp/c) when the concentration (c) was extrapolated to be 0, was obtained as the intrinsic viscosity $[\eta]$ (dl/g)

Color Tone

A resin sample was filled into a cylindrical powder calorimetric cell having an inner diameter of 36 mm and a depth of 15 mm to be flush, and by means of a calorimetric color difference meter ("ND-300A", manufactured by NIPPON DENSHOKU INDUSTRIES CO., LTD.), color coordinate b of the Hunter's color difference formula in the Lab color system as disclosed in Reference 1 of JIS Z8730, was obtained as a simple average value of values measured at four positions by rotating the cell every 90° by a reflection method.

Cyclic Trimer Content (CT)

4.0 mg of a resin sample was accurately weighted and dissolved in 2 ml of a mixed solvent of chloroform/hexafluoroisopropanol (volume ratio: 3/2), and then further diluted by an addition of 20 ml of chloroform. Then, 10 ml of methanol was added thereto for reprecipitation, followed by filtration to obtain a filtrate, which was evaporated to dryness. Then, the residue was dissolved in 25 ml of dimethylformamide. The amount of a cyclic trimer (cyclotriethylene terephthalate) in this solution was quantitatively analyzed by liquid chromatography ("LC-10A", manufactured by Shimadzu Corporation).

Then, the obtained resin was dried at 160° C. for at least 16 hours in a vacuum dryer ("DP-41 model", manufactured by YAMATO CHEMICAL INDUSTRY CO., LTD). Then, by an injection molding machine ("M-70AII-DM", manufactured by Meiki Co., Ltd.), a stepped molded plate having the shape as shown in FIG. 1 and having a size of 50 mm×100 mm and thicknesses of six steps ranging from 6 mm to 3.5 mm in a transverse direction with each step being 0.5 mm, was injection-molded at a cylinder temperature of 280° C. under a back pressure of 5×10$^5$ Pa at an injection rate of 40 cc/sec under a dwell pressure of 35×10$^5$ Pa at a mold temperature of 25° C. and with a molding cycle of about 75 seconds. Further, in FIG. 1, G indicates a gate portion.

With respect to the molded plate thus obtained, the absorbance at a wavelength of 395 nm and 500 nm, and the temperature-rising crystallization temperature (Tc) were measured by the following methods, and the results are shown in Table 1.

Absorbance

The portion having a thickness of 3.5 mm (portion A+B in FIG. 1) in the molded plate, was measured by means of a ultraviolet visible light spectrophotometer ("UV-2400", manufactured by Shimadzu Corporation) at a scanning speed adjusted to be a low speed mode (127 nm/min within a wavelength range of from 300 to 800 nm with a slit width of 5 nm at a sampling pitch of 0.5 nm by a transmission mode, whereby the differences from the absorbance at a wavelength of 800 nm, of the absorbances at wavelengths of 395 nm and 500 nm, were obtained.

Temperature-Rising Crystallization Temperature (Tc)

The forward end portion (portion A in FIG. 1) having a thickness of 3.5 mm in the molded plate, was cut out and dried at 40° C. for 3 days by a vacuum dryer, whereupon a sample cut out from the non-surface portion was used, and about 10 mg thereof was accurately weighed and sealed in by means of an aluminum oven pan and a pan cover (normal pressure type, "P/N SSC000E030" and "P/N SSC000E032", manufactured by Seiko Denshi K.K.). By means of a differential scanning calorimeter ("DSC220C", manufactured by Seiko K.K.), the sample was heated from 20° C. to 285° C. at a rate of 20° C./min in a nitrogen stream, and the crystallization peak temperature observed during the temperature rise, was measured.

Separately, the obtained polyester resin chips were dried at 130° C. for 10 hours by a vacuum dryer. Then, by an injection molding machine ("FE-80S", manufactured by Nissei Plastic Industrial Co., Ltd.), a preform of a test tube shape having an outer diameter of 29.0 mm, a height of 165 mm, an average wall thickness of 3.7 mm and a weight of 60 g, was injection-molded at a cylinder temperature of 280° C. under a back pressure of 5×10$^5$ Pa at an injection rate of 45 cc/sec under a dwell pressure of 30×10$^5$ Pa at a mold temperature of 20° C. with a molding cycle of about 40 seconds.

Such preforms were heated for 70 seconds in a near infrared ray irradiation furnace equipped with a quartz heater, then left at room temperature for 25 seconds and then introduced into a blow mold set at 160° C. and subjected to blow molding under a blow pressure of about 7×10$^5$ Pa for one second and then under a blow pressure of about 30×10⁵ Pa for 40 seconds for heat setting, while stretching it in the height direction by a stretching rod, followed by cooling in air to obtain 500 bottles having an outer diameter of about 95 mm, a height of about 305 mm, an average wall thickness of the body portion of about 0.37 mm, a weight of about 60 g and an internal capacity of about 1.5 l. With respect to the obtained 498th to 500th bottles, the aroma-retention property was measured and evaluated by the following method, and the results are shown in Table 1.

Aroma-Retention Property

In a bottle, a 100% orange juice was filled in a hot state, tightly sealed with a cap and stored at 10° C. for one month, whereupon the cap was removed, and the aroma was subjected to a sensory test by comparing it with a case where the orange juice was stored under the same conditions in a glass bottle, whereby evaluation was made under the following standards.

○: there was no difference in aroma from the glass bottle, and the aroma-retention property was good.
Δ: the aroma was weak as compared with the glass bottle, and the aroma-retention property was slightly poor.
X: the aroma was extremely weak as compared with the glass bottle, and the aroma-retention property was inferior.

Further, with respect to the obtained 491st to 500th bottles, the surface appearance of the body portion of each bottle was visually observed and evaluated under the following standards, to evaluate the mold contamination, and the results are shown in Table 1.

⊚: the surface was smooth, and no mold contamination was observed.
○: the surface smoothness was slightly inferior, and accordingly, the mold contamination was slightly observed but was not practically problematic.
X: the surface was roughened, deposition of foreign matters was observed, and the mold contamination was substantial.

EXAMPLES 2 TO 6

The operation was carried out in the same manner as in Example 1 except that the amounts of ethyl acid phosphate, magnesium acetate and tetra-n-butoxy titanium at the time of the melt polycondensation were changed as shown in Table 1, and then results are shown in Table 1.

EXAMPLE 7

The operation was carried out in the same manner as in Example 2 except that the solid phase polycondensation polyester resin obtained in Example 2 was further subjected to water treatment by immersing it in hot water of 90° C. for two hours, and the results are shown in Table 1.

EXAMPLE 8

The operation was carried out in the same manner as in Example 7 except that the polyester resin obtained in Example 7 was used, and a low density polyethylene was added at the time of the injection molding of the stepped molding plate and at the time of the injection molding of the preform, and the results are shown in Table 1.

COMPARATIVE EXAMPLE 1

The operation was carried out in the same manner as in Example 1 except that at the time of the melt polycondensation, ethyl acid phosphate, magnesium acetate and antimony trioxide were sequentially added in their ethylene glycol solutions, respectively, with intervals of 5 minutes, and the respective amounts were adjusted as shown in Table 1, and the results are shown in Table 1.

COMPARATIVE EXAMPLE 2

The operation was carried out in the same manner as in Example 1 except that at the time of the melt polycondensation, orthophosphoric acid and germanium dioxide were sequentially added in their ethylene glycol solutions, respectively, with intervals of 5 minutes, and the respective amounts were adjusted as shown in Table 1, and the results are shown in Table 1.

COMPARATIVE EXAMPLE 3

The operation was carried out in the same manner as in Comparative Example 2 except that the amount of germanium dioxide was changed, and the obtained solid phase polycondensation polyester resin was further subjected to water treatment by dipping it in hot water at 90° C. for 4 hours, and the results are shown in Table 1.

COMPARATIVE EXAMPLE 4

The operation was carried out in the same manner as in Example 1 except that at the time of the melt polycondensation, tetra-n-butoxy titanium, magnesium acetate and ethyl acid phosphate were sequentially added in their ethylene glycol solutions, respectively, with intervals of 5 minutes, and the respective amounts were adjusted as shown in Table 1, and the results are shown in Table 1.

TABLE 1

| | | | Examples | | | | | | | |
|---|---|---|---|---|---|---|---|---|---|---|
| | | | 1 | 2 | 3 | 4 | 5 | 6 | 7 | 8 |
| Copolymerizable components | Diethylene glycol (mol % based on dial) | | 1.8 | 1.7 | 1.8 | 1.6 | 1.6 | 1.7 | 1.7 | 1.7 |
| Contents of metal atoms | Titanium atoms (T) | (mol/t) | 0.063 | 0.063 | 0.063 | 0.063 | 0.063 | 0.125 | 0.063 | 0.063 |
| | Magnesium atoms (M) | (mol/t) | 0.062 | 0.123 | 0.247 | 0.123 | 0.123 | 0.247 | 0.123 | 0.123 |
| | Germanium atoms (Ge) | (mol/t) | | | | | | | | |
| | Antimony atoms (Sb) | (mol/t) | | | | | | | | |
| | Phosphorus atoms (P) | (mol/t) | 0.387 | 0.387 | 0.387 | 0.194 | 0.065 | 0.387 | 0.387 | 0.387 |
| | P/T | (mol/mol) | 6.14 | 6.14 | 6.14 | 3.08 | 1.03 | 3.10 | 6.14 | 6.14 |
| | M/T | (mol/mol) | 0.98 | 1.95 | 3.92 | 1.95 | 1.95 | 1.98 | 1.95 | 1.95 |
| | P/M | (mol/mol) | 6.24 | 3.15 | 1.57 | 1.58 | 0.53 | 1.57 | 3.15 | 3.15 |

TABLE 1-continued

|  |  |  |  |  |  |  |  |  |  |  |
|---|---|---|---|---|---|---|---|---|---|---|
| Resin chips | P/(T + M) | (mol/mol) | 3.10 | 2.08 | 1.25 | 1.04 | 0.35 | 1.04 | 2.08 | 2.08 |
|  | Intrinsic viscosity [η] | (dl/g) | 0.74 | 0.75 | 0.75 | 0.73 | 0.74 | 0.74 | 0.75 | 0.75 |
|  | Color coordinate b |  | +2.6 | +1.8 | +2.4 | +2.4 | +3.4 | +4.7 | +1.8 | +1.8 |
|  | Cyclic trimer content (CT) | (wt %) | 0.29 | 0.32 | 0.33 | 0.29 | 0.27 | 0.22 | 0.32 | 0.32 |
| Stepped molded plate | Absorbance | 395 nm | 0.16 | 0.11 | 0.15 | 0.14 | 0.19 | 0.26 | 0.11 | 0.11 |
|  |  | 500 nm | 0.02 | 0.02 | 0.02 | 0.02 | 0.02 | 0.02 | 0.02 | 0.02 |
|  | Temperature-rising crystallization temperature (Tc) | (° C.) | 165 | 166 | 165 | 172 | 178 | 165 | 164 | 161 |
| Bottle | Aroma-retention property |  | ◯ | ◯ | ◯ | ◯ | ◯ | ◯ | ◯ | ◯ |
|  | Mold contamination property |  | ◯ | ◯ | ◯ | ◯ | ◯ | ◯ | ◉ | ◉ |

|  |  |  |  | Comparative Example | | | |
|---|---|---|---|---|---|---|---|
|  |  |  |  | 1 | 2 | 3 | 4 |
| Copolymerizable components | Diethylene glycol (mol % based on diol) |  |  | 3.5 | 2.5 | 2.5 | 3.8 |
| Contents of metal atoms | Titanium atoms (T) | (mol/t) |  |  |  |  | 1.086 |
|  | Magnesium atoms (Mg) | (mol/t) |  | 2.057 |  |  | 2.180 |
|  | Germanium atoms (Ge) | (mol/t) |  |  | 0.551 | 0.716 |  |
|  | Antimony atoms (Sb) | (mol/t) |  | 1.372 |  |  |  |
|  | Phosphorus atoms (P) | (mol/t) |  | 2.906 | 0.969 | 0.969 | 0.549 |
|  | P/T | (mol/mol) |  | — | — | — | 0.5 |
|  | M/T | (mol/mol) |  | — | — | — | 2.00 |
|  | P/M | (mol/mol) |  | 1.41 | — | — | 0.25 |
|  | P/(T + M) | (mol/mol) |  | — | — | — | 0.17 |
| Resin chips | Intrinsic viscosity [η] | (dl/g) |  | 0.78 | 0.76 | 0.76 | 0.75 |
|  | Color coordinate b |  |  | +0.8 | +0.9 | +1.2 | +14.3 |
|  | Cyclic trimer content (CT) | (wt %) |  | 0.40 | 0.42 | 0.32 | 0.34 |
| Stepped molded plate | Absorbance | 395 nm |  | 0.04 | 0.06 | 0.05 | 0.42 |
|  |  | 500 nm |  | 0.01 | 0.01 | 0.01 | 0.06 |
|  | Temperature-rising crystallization temperature (Tc) | (° C.) |  | 142 | 168 | 166 | 153 |
| Bottle | Aroma-retention property |  |  | X | Δ | Δ | X |
|  | Mold contamination property |  |  | ◯ | ◯ | ◉ | X |

EXAMPLE 9

Using a continuous polymerization apparatus comprising a slurry preparation tank, esterification reactors of two stages connected in series thereto and melt polycondensation tanks of three stages connected in series to the second stage esterification reactor, terephthalic acid and ethylene glycol were continuously supplied in a weight ratio of 865:485 to the slurry preparation tank, and a 0.3 wt % ethylene glycol solution of ethyl acid phosphate, was continuously added in such an amount that the content as phosphorus atoms (P) per 1 ton of the formed polyester resin would be 0.194 mol, followed by stirring and mixing to obtain a slurry. This slurry was transferred to the first stage esterification reactor set for an average retention time of 4 hours in a nitrogen atmosphere at 260° C. under a relative pressure of 50 kPa (0.5 kg/cm²G) and then to the second stage esterification reactor set for an average retention time of 1.5 hours in a nitrogen atmosphere at 260° C. under a relative pressure of 5 kPa (0.05 kg/cm²G), to carry out the esterification reaction. At that time, the average esterification ratio as measured by the following method, was 85% in the first stage and 95% in the second stage.

Average Esterification Ratio

With respect to a solution having a sample dissolved at a concentration of 3 wt % in a mixed solvent of deuterated chloroform/hexafluoroisopropanol (weight ratio: 7/3), $^1$H-NMR was measured by a nuclear magnetic resonance apparatus ("JNM-EX270 model", manufactured by Nihon Denshi K.K.), and each peak was identified. The amount of terminal carboxyl groups (A mol/ton sample) was calculated from the integral value of the peak, and by the following formula, the esterification ratio (E %) was calculated as a proportion of the esterified among all carboxyl groups of terephthalic acid units.

Esterification ratio $(E)=[1-A/\{(1,000,000/192.2) \times 2\}] \times 100$

Further, at that time, via an upper pipe provided at the second stage, a 0.6 wt % ethylene glycol solution of magnesium acetate tetrahydrate was continuously added in such an amount that the content as magnesium atoms (Mg) per 1 ton of the formed polyester resin would be 0.247 mol.

Continuously, at the time of transporting the esterification reaction product obtained as described above to the melt polycondensation tank, tetrabutyl titanate in the form of an ethylene glycol solution having a concentration of titanium atoms of 0.15 wt % and a water concentration of 0.5 wt %, was continuously added to the esterification reaction product in the transportation pipe in such an amount that the content as titanium atoms (Ti) per 1 ton of the formed polyester resin would be 0.063 mol, and the esterification reaction product was continuously transferred to the first stage melt polycondensation tank set at 270° C. under an absolute pressure of 2.6 kPa (20 Torr), then to the second stage melt polycondensation tank set at 278° C. under an absolute pressure of 0.5 kPa (4 Torr) and then to the third stage melt polycondensation tank set at 280° C. under an absolute pressure of 0.3 kPa (2 Torr), to carry out the melt polycondensation for a total of 3.17 hours by adjusting the retention times in the respective polycondensation tanks so that the intrinsic viscosity ([η$_1$]) of the obtained polyester resin would be 0.56 dl/g, whereupon the product is withdrawn in the form of a strand from a discharge outlet provided at the bottom of the polycondensation tank, cooled with water and then cut by a cutter to obtain a polyester resin in the form of chips.

Then, the polyester resin chips obtained as described above were continuously supplied for crystallization to an agitation crystallization machine held at about 160° C. in a nitrogen atmosphere so that the retention time would be about 60 minutes and then continuously supplied to a tower type solid polycondensation apparatus and heated at 205° C. in a nitrogen atmosphere for 19 hours for solid phase polycondensation by adjusting the retention time so that the intrinsic viscosity ($[\eta_2]$) of the obtained polyester resin would be 0.75 dl/g. The intrinsic viscosity ($[\eta_1]$) of the above melt polycondensate resin and the intrinsic viscosity ($[\eta_2]$) of the solid polycondensate resin, were measured by the above-mentioned method.

Further, the melt polycondensation rate ($V_1$) as a value obtained by dividing the intrinsic viscosity ($[\eta_1]$) of the above melt polycondensate resin by the melt polycondensation time, the solid phase polycondensation rate ($V_2$) as a value obtained by dividing the difference ($[\eta_2]-[\eta_1]$) between the above intrinsic viscosity ($[\eta_2]$) of the above solid polycondensate resin and the intrinsic viscosity ($[\eta_1]$) of the above melt polycondensate resin, by the solid phase polycondensation time, and the ratio ($V_2/V_1$) of the solid phase polycondensation rate ($V_2$) to the melt polycondensation rate ($V_1$), were calculated, respectively, and the results are shown in Table 2.

Further, with respect to the obtained solid phase polycondensate resin chips, the contents of titanium atoms (Ti), magnesium atoms (Mg) and phosphorus atoms (P) of the titanium component, the magnesium component and the phosphorus component, respectively, per 1 ton of the resin, were measured by the above-mentioned methods, and the results are shown in Table 2.

Further, with respect to the obtained solid phase polycondensate resin chips, the copolymerized amount of diethylene glycol, the cyclic trimer content (CT) and the color coordinate value b as the color tone, were measured by the above-mentioned methods, and the acetaldehyde content ($AA_1$) was measured by the following method. The results are shown in Table 2.

Acetaldehyde Content ($AA_1$)

5.0 g of a resin sample was accurately weighed and sealed in together with 10 ml of pure water in a micro bomb having an internal capacity of 50 mΩ under sealing with nitrogen, whereupon heat extraction was carried out at 160° C. for 2 hours. The amount of acetaldehyde in the extracted solution was quantitatively analyzed by gas chromatography ("GC-14A", manufactured by Shimadzu Corporation) using isobutyl alcohol as the internal standard.

Then, the obtained resin was dried at 160° C. for 4 hours in a nitrogen stream of 40 l/min in an inert oven ("IPHH-201 model", manufactured by ESPEC COMPANY), and then, by an injection molding machine ("M-70AII-DM", manufactured by Meiki Co., Ltd.), a stepped molded plate having a shape shown in FIG. 1, was injection-molded at a cylinder temperature of 280° C. under a back pressure of 5×10⁵ Pa at an injection rate of 40 cc/sec under a dwell pressure of 35×10⁵ Pa at a mold temperature of 25° C. with a molding cycle of about 75 seconds.

With respect to the molded plate, the absorbances at wavelengths of 395 nm and 500 nm were measured by the above-mentioned method, and further, the acetaldehyde content ($AA_2$) and the haze, were measured by the following methods. The results are shown in Table 2.

Acetaldehyde Content ($AA_2$)

Using samples cut out in the form of chips of about 4×4 mm from the rear end portion having a thickness of 3.5 mm (portion B in FIG. 1) in the molded plate, the measurement was carried out by the same method as described above.

Haze

With respect to the portion having a thickness of 5.0 mm (portion C in FIG. 1) in the molded plate, the haze was measured by means of a haze meter ("NDH-300A", manufactured by NIPPON DENSHOKU INDUSTRIES CO., LTD.).

Separately, the obtained polyester resin chips were dried at 130° C. for 10 hours in a vacuum dryer. Then, by an injection molding machine ("FE-80S", manufactured by Nissei Plastic Industrial Co., Ltd.), a preform of a test tube shape having an outer diameter of 29.0 mm, a height of 165 mm, an average wall thickness of 3.7 mm and a weight of about 60 g, was injection-molded at a cylinder temperature of 280° C. under a back pressure of 5×10⁵ Pa at an injection rate of 45 cc/sec under a dwell pressure of 30×10⁵ Pa at a mold temperature of 20° C. with a molding cycle of about 40 seconds.

The obtained preform was heated for 70 seconds in a near infrared ray irradiation furnace equipped with a quartz heater and then left to stand at room temperature for 25 seconds. Then, it was introduced into a blow mold set at 130° C. and blow-molded under a blow pressure of 7×10⁵ Pa for one second and further under a blow pressure of 30×10⁵ Pa for 5 seconds, while stretching in the height direction by an stretching rod, heat-set and cooled in air to mold a bottle having an outer diameter of about 95 mm, a height of about 305 mm, an average wall thickness of the body portion of about 0.35 mm, a weight of about 60 g and an internal capacity of about 1.5Q.

With respect to the obtained bottle, the aroma-retention property and the mold contamination were measured and evaluated by the above-mentioned methods, and further, the acetaldehyde odor was evaluated by the following method. The results are shown in Table 2.

Acetaldehyde Odor of the Bottle

The bottle was heated in an oven at 50° C. for one hour, whereupon the acetaldehyde odor was examined by a sensory test and evaluated by five stages ranging from 5 (acetaldehyde odor very little) to 1 (acetaldehyde odor assails ones nostrils).

EXAMPLES 10 TO 23, AND COMPARATIVE EXAMPLES 5 TO 7

Polyester resin chips were prepared in the same manner as in Example 9 except that the copolymerizable component and its amount, the amounts and order for addition of the phosphorus compound, the magnesium compound and the titanium compound, the concentration of titanium atoms and the water concentration in the ethylene glycol solution of the titanium compound, and the melt polycondensation time and the solid phase polycondensation time, were changed as identified in Table 2, and evaluated in the same manner. The results are shown in Table 2. In Comparative Example 5, phosphorous acid instead of ethyl acid phosphate, cobalt acetate tetrahydrate instead of magnesium acetate tetrahydrate and titanium potassium oxalate instead of tetrabutyl titanate, were used and added in the order of titanium potassium oxalate, then cobalt acetate tetrahydrate and then phosphorous acid. In Comparative Example 7, orthophosphoric acid was used instead of ethyl acid phosphate, and the order of addition was tetrabutyl titanate, then magnesium acetate tetrahydrate and then orthophosphoric acid.

TABLE 2

|  |  |  | Examples ||||||||| 
|---|---|---|---|---|---|---|---|---|---|---|---|
|  |  |  | 9 | 10 | 11 | 12 | 13 | 14 | 15 | 16 | 17 |
| Copolymerizable components | Diethylene glycol (mol % based on diol) |  | 2.2 | 2.2 | 2.2 | 2.2 | 2.2 | 2.2 | 1.7 | 2.2 | 2.2 |
|  | Isophthalic acid (mol % based on dicarboxylic acid) |  |  |  |  |  |  |  | 1.8 |  |  |
| Ethylene glycol solution of the titanium compound | Concentration of titanium atoms | (wt %) | 0.15 | 0.15 | 0.15 | 0.15 | 0.15 | 0.15 | 0.15 | 0.40 | 0.15 |
|  | Water concentration | (wt %) | 0.5 | 0.5 | 0.5 | 0.5 | 0.5 | 0.5 | 0.5 | 1.5 | 0.03 |
| Contents of metal atoms | Titanium atoms (T) | (mol/t) | 0.063 | 0.063 | 0.063 | 0.063 | 0.063 | 0.125 | 0.063 | 0.063 | 0.063 |
|  | Magnesium atoms (M) | (mol/t) | 0.247 | 0.123 | 0.370 | 0.247 | 0.247 | 0.247 | 0.247 | 0.247 | 0.247 |
|  | Cobalt atoms (M) | (mol/t) |  |  |  |  |  |  |  |  |  |
|  | Phosphorus atoms (P) | (mol/t) | 0.194 | 0.194 | 0.194 | 0.065 | 0.387 | 0.387 | 0.194 | 0.194 | 0.194 |
|  | P/T | (mol/mol) | 3.1 | 3.1 | 3.1 | 1.0 | 6.2 | 3.1 | 3.1 | 3.1 | 3.1 |
|  | M/T | (mol/mol) | 3.9 | 2.0 | 5.9 | 3.9 | 3.9 | 2.0 | 3.9 | 3.9 | 3.9 |
| Polycondensation rate | Melt polycondensation time | (hr) | 3.17 | 3.33 | 3.00 | 3.00 | 3.33 | 3.00 | 3.17 | 3.25 | 3.25 |
|  | Intrinsic viscosity [$\eta_1$] | (dl/g) | 0.56 | 0.56 | 0.56 | 0.56 | 0.56 | 0.56 | 0.56 | 0.56 | 0.56 |
|  | Polycondensation rate ($V_1$) | (dl/g/hr) | 0.177 | 0.168 | 0.187 | 0.187 | 0.168 | 0.187 | 0.177 | 0.172 | 0.172 |
|  | Solid phase polycondensation time | (hr) | 19 | 20 | 22 | 18 | 28 | 18 | 18 | 20 | 20 |
|  | Intrinsic viscosity [$\eta_2$] | (dl/g) | 0.75 | 0.75 | 0.75 | 0.77 | 0.77 | 0.76 | 0.75 | 0.75 | 0.75 |
|  | Polycondensation rate ($V_2$) | (dl/g/hr) | 0.010 | 0.010 | 0.009 | 0.012 | 0.008 | 0.011 | 0.011 | 0.010 | 0.010 |
|  | $V_2/V_1$ |  | 0.057 | 0.060 | 0.046 | 0.063 | 0.045 | 0.060 | 0.060 | 0.055 | 0.055 |
| Resin chips | Acetaldehyde content ($AA_1$) | (ppm) | 3 | 4 | 4 | 3 | 4 | 4 | 3 | 4 | 4 |
|  | Cyclic trimer content (CT) | (wt %) | 0.28 | 0.28 | 0.32 | 0.24 | 0.24 | 0.19 | 0.27 | 0.28 | 0.28 |
|  | Color coordinate b |  | +2.2 | +2.4 | +2.2 | +3.4 | +2.4 | +4.7 | +2.2 | +2.4 | +2.4 |
| Stepped molded plate | Absorbance | 395 nm | 0.16 | 0.14 | 0.16 | 0.20 | 0.15 | 0.26 | 0.16 | 0.16 | 0.16 |
|  |  | 500 nm | 0.02 | 0.02 | 0.02 | 0.02 | 0.02 | 0.02 | 0.02 | 0.02 | 0.02 |
|  | Acetaldehyde content ($AA_2$) | (ppm) | 16 | 18 | 15 | 20 | 14 | 20 | 14 | 16 | 16 |
|  | Haze | (%) | 7 | 8 | 8 | 8 | 7 | 8 | 4 | 12 | 15 |
| Bottle | Aroma-retention property |  | ○ | ○ | ○ | ○ | ○ | ○ | ○ | ○ | ○ |
|  | Mold contamination property |  | ○ | ○ | ○ | ○ | ○ | ○ | ○ | ○ | ○ |
|  | Acetaldehyde odor |  | 4 | 4 | 4 | 4 | 5 | 4 | 5 | 4 | 4 |

|  |  |  | Examples |||||| Comparative Examples ||| 
|---|---|---|---|---|---|---|---|---|---|---|---|
|  |  |  | 18 | 19 | 20 | 21 | 22 | 23 | 5 | 6 | 7 |
| Copolymerizable components | Diethylene glycol (mol % based on diol) |  | 2.2 | 2.2 | 2.2 | 2.2 | 2.2 | 2.2 | 3.1 | 2.8 | 3.8 |
|  | Isophthalic acid (mol % based on dicarboxylic acid) |  |  |  |  |  |  |  |  |  |  |
| Ethylene glycol solution of the titanium compound | Concentration of titanium atoms | (wt %) | 0.15 | 0.15 | 0.15 | 0.15 | 0.15 | 0.15 | 0.15 | 0.15 | 0.15 |
|  | Water concentration | (wt %) | 0.5 | 0.5 | 0.5 | 0.5 | 0.5 | 0.5 | 0.03 | 0.03 | 0.03 |
| Contents of metal atoms | Titanium atoms (T) | (mol/t) | 0.010 | 0.313 | 0.063 | 0.063 | 0.063 | 0.063 | 0.125 | 0.021 | 1.086 |
|  | Magnesium atoms (Mg) | (mol/t) | 0.247 | 0.247 |  | 0.740 | 0.247 | 0.247 |  | 1.550 | 2.180 |
|  | Cobalt atoms (M) | (mol/t) |  |  |  |  |  |  | 1.033 |  |  |
|  | Phosphorus atoms (P) | (mol/t) | 0.387 | 0.387 | 0.194 | 0.194 |  | 0.775 | 0.494 | 1.070 | 0.549 |
|  | P/T | (mol/mol) | 37.1 | 1.2 | 3.1 | 3.1 | 0 | 12.4 | 3.95 | 1.2 | 0.5 |
|  | M/T | (mol/mol) | 23.6 | 0.8 | 0 | 11.7 | 3.9 | 3.9 | 8.37 | 74.2 | 2.0 |
| Polycondensation rate | Melt polycondensation time | (hr) | 4.00 | 2.00 | 3.67 | 2.75 | 2.83 | 4.00 | 3.50 | 3.50 | 2.00 |
|  | Intrinsic viscosity [$\eta_1$] | (dl/g) | 0.56 | 0.56 | 0.56 | 0.56 | 0.56 | 0.56 | 0.56 | 0.56 | 0.56 |
|  | Polycondensation rate ($V_1$) | (dl/g/hr) | 0.140 | 0.280 | 0.153 | 0.204 | 0.198 | 0.140 | 0.160 | 0.160 | 0.280 |
|  | Solid phase polycondensation time | (hr) | 38 | 12 | 26 | 32 | 15 | 42 | 43 | 42 | 12 |
|  | Intrinsic viscosity [$\eta_2$] | (dl/g) | 0.76 | 0.76 | 0.75 | 0.75 | 0.77 | 0.77 | 0.75 | 0.75 | 0.75 |
|  | Polycondensation rate ($V_2$) | (dl/g/hr) | 0.005 | 0.017 | 0.007 | 0.006 | 0.014 | 0.005 | 0.004 | 0.005 | 0.016 |
|  | $V_2/V_1$ |  | 0.038 | 0.060 | 0.048 | 0.029 | 0.071 | 0.036 | 0.028 | 0.029 | 0.057 |
| Resin chips | Acetaldehyde content ($AA_1$) | (ppm) | 4 | 11 | 4 | 4 | 3 | 4 | 8 | 3 | 11 |
|  | Cyclic trimer content (CT) | (wt %) | 0.55 | 0.17 | 0.28 | 0.56 | 0.21 | 0.45 | 0.88 | 0.49 | 0.34 |
|  | Color coordinate b |  | +0.6 | +11.3 | +2.4 | +2.4 | +4.2 | +2.4 | −2.3 | +2.2 | +14.3 |
| Stepped molded plate | Absorbance | 395 nm | 0.09 | 0.31 | 0.20 | 0.21 | 0.27 | 0.10 | 0.06 | 0.06 | 0.42 |
|  |  | 500 nm | 0.01 | 0.05 | 0.03 | 0.03 | 0.04 | 0.02 | 0.01 | 0.01 | 0.06 |
|  | Acetaldehyde content ($AA_2$) | (ppm) | 18 | 30 | 21 | 14 | 28 | 13 | 27 | 23 | 35 |
|  | Haze | (%) | 7 | 12 | 9 | 8 | 12 | 7 | 8 | 8 | 70 |

TABLE 2-continued

| Bottle | Aroma-retention property | ○ | ○ | ○ | ○ | ○ | ○ | X | ○ | X |
|---|---|---|---|---|---|---|---|---|---|---|
|  | Mold contamination property | ○ | ○ | ○ | ○ | ○ | ○ | X | ○ | X |
|  | Acetaldehyde odor | 4 | 1 | 3 | 5 | 2 | 5 | 2 | 3 | 1 |

INDUSTRIAL APPLICABILITY

According to the present invention, it is possible to provide a polyester resin, whereby a molded product excellent in a gas barrier property and also excellent in an ultraviolet shielding property, color tone, etc., and which is particularly suitable for molding a bottle for e.g. a beverage required to have an aroma-retention property and further to provide a polyester resin, whereby the acetaldehyde content in a molded product is reduced to eliminate an influence over the taste, aroma, etc. of the content, and a process for its production, whereby the polycondensability is improved.

What is claimed is:

1. A polyester resin produced by polycondensing a dicarboxylic acid component containing terephthalic acid or its ester-forming derivative as the main component, and a diol component containing ethylene glycol as the main component in the presence of (1) a compound of at least one member selected from the group consisting of titanium group elements in Group 4A of the periodic table, via an esterification reaction or an ester exchange reaction, characterized in that the content of copolymerized components other than the terephthalic acid component and the ethylene glycol component, is not more than 4 mol % based on the total dicarboxylic acid component, and in a molded product with a thickness of 3.5 mm injection-molded at 280° C., the difference between the absorbance at a wavelength of 395 nm and the absorbance at a wavelength of 800 nm is at least 0.08, and the difference between the absorbance at a wavelength of 500 nm and the absorbance at a wavelength of 800 nm is at most 0.05.

2. The polyester resin according to claim 1, wherein the temperature-rising crystallization temperature (Tc) of the resin in the molded product after the injection molding at 280° C., is from 150 to 180° C.

3. The polyester resin according to claim 1, wherein the resin before the injection molding is one having an intrinsic viscosity ([η]) of from 0.70 to 0.90 dl/g and a color coordinate value b of the Hunter's color difference formula of not more than 4.

4. The polyester resin according to claim 1, wherein the content of the compound (1) is from 0.002 to 1 mol as the total amount (T) of atoms of the compound (1) per 1 ton of the polyester resin.

5. The polyester resin according to claim 4, which is one polycondensed in the coexistence of (2) a compound of at least one element selected from the group consisting of metal elements of Group Ia of the periodic table, elements of Group IIa of the periodic table, manganese, iron and cobalt, and (3) a phosphorus compound, wherein the content of the compound (2) is from 0.04 to 5 mols as the total amount (M) of atoms of the compound (2) per 1 ton of the polyester resin, and the content of the compound (3) is from 0.02 to 4 mols as the total amount (P) of atoms of the compound (3) per 1 ton of the polyester resin.

6. The polyester resin according to claim 5, wherein the contents of the respective compounds (1), (2) and (3) are from 0.02 to 0.2 mol as the total amount (T) of atoms of the compound (1), from 0.04 to 0.6 mol as the total amount (M) of atoms of the compound (2) and from 0.02 to 0.4 mol as the total amount (P) of atoms of the compound (3), per 1 ton of the polyester resin, the acetaldehyde content ($AA_1$) is not more than 5.0 ppm, the acetaldehyde content ($AA_2$) of the resin in a molded product after injection-molded at 280° C. is not more than 20 ppm, and the haze of a molded product with a thickness of 5 mm after the injection molding at 280° C. is not more than 10%.

7. The polyester resin according to claim 1, wherein the compound (1) is a titanium compound, the compound (2) is a magnesium compound, and the compound (3) is a phosphoric acid ester.

8. The polyester resin according to claim 1, wherein, as a dicarboxylic acid component, from 0.1 to 3 mol % of isophthalic acid or its ester-forming derivative based on the total dicarboxylic acid component, and as a diol component, from 1 to 3 mol % of diethylene glycol based on the total diol component, are copolymerized, respectively.

9. A process for producing a polyester resin, which comprises polycondensing a dicarboxylic acid component containing terephthalic acid or its ester-forming derivative as the main component, and a diol component containing ethylene glycol as the main component in the presence of (1) a compound of at least one member selected from the group consisting of titanium group elements in Group 4A of the periodic table, (2) a compound of at least one element selected from the group consisting of metal elements of Group Ia of the periodic table, elements of Group IIa of the periodic table, manganese, iron and cobalt, and (3) a phosphorus compound, via an esterification reaction or an ester exchange reaction, characterized in that the amounts of the respective compounds (1), (2) and (3) are such amounts that their contents will be from 0.02 to 0.2 mol as the total amount (T) of atoms of the compound (1), from 0.04 to 0.6 mol as the total amount (M) of atoms of the compound (2) and from 0.02 to 0.4 mol as the total amount (P) of atoms of the compound (3), per 1 ton of the polyester resin.

10. The process for producing a polyester resin according to claim 9, wherein the ratio (P/T) of the total amount (P) of atoms of the compound (3) to the total amount (T) of atoms of the compound (1), is from 0.1 to 10.

11. The process for producing a polyester resin according to claim 9, wherein the ratio (M/T) of the total amount (M) of atoms of the compound (2) to the total amount (T) of atoms of the compound (1), is from 0.1 to 10.

12. The process for producing a polyester resin according to claim 9, wherein the order for addition of the respective compounds (1), (2) and (3) to the reaction system is (3), then (2) and then (1).

13. The process for producing a polyester resin according to claim 9, wherein the compound (1) is a titanium compound, the compound (2) is a magnesium compound, and the compound (3) is a phosphoric acid ester.

14. The process for producing a polyester resin according to claim 13, wherein the titanium compound is added to the reaction system in the form of an ethylene glycol solution having a titanium atom concentration of from 0.01 to 0.3 wt % and a water concentration of from 0.1 to 1 wt %.

15. The process for producing a polyester resin according to claim 9, wherein from 0.1 to 3 mol % of isophthalic acid or its ester-forming derivative is used based on the total dicarboxylic acid component.

* * * * *